United States Patent
Wills (10) Patent No.: US 8,240,690 B2
(45) Date of Patent: Aug. 14, 2012

(54) HUMAN ENERGY TRANSDUCTION AND STORAGE SYSTEM HAVING A ONE-WAY CLUTCH

(76) Inventor: Peter Lawrence Wills, Langwarren (AU)

( * ) Notice: Subject to any disclaimer, the term of this patent is extended or adjusted under 35 U.S.C. 154(b) by 442 days.

(21) Appl. No.: 12/593,007

(22) PCT Filed: Apr. 10, 2008

(86) PCT No.: PCT/AU2008/000513
§ 371 (c)(1),
(2), (4) Date: Sep. 25, 2009

(87) PCT Pub. No.: WO2008/124873
PCT Pub. Date: Oct. 23, 2008

(65) Prior Publication Data
US 2010/0109280 A1    May 6, 2010

(30) Foreign Application Priority Data
Apr. 13, 2007    (AU) .............................. 2007901956

(51) Int. Cl.
*B62M 1/10* (2010.01)
(52) U.S. Cl. ........................................ 280/214; 280/255
(58) Field of Classification Search .................. 280/214, 280/215, 255, 212, 230, 236; 475/297
See application file for complete search history.

(56) References Cited

U.S. PATENT DOCUMENTS

| | | | |
|---|---|---|---|
| 2,316,530 A * | 4/1943 | Nilsen | 74/594.3 |
| 3,754,413 A * | 8/1973 | Borrini | 464/48 |
| 3,894,615 A * | 7/1975 | Lew | 185/39 |
| 4,416,464 A * | 11/1983 | Mattox | 280/215 |
| 4,770,054 A | 9/1988 | Ha | |
| 4,857,032 A | 8/1989 | Aiki et al. | |
| 5,035,678 A | 7/1991 | Hageman | |
| 5,078,647 A * | 1/1992 | Hampton | 464/1 |
| 5,279,524 A * | 1/1994 | Hilber | 474/69 |
| 5,324,238 A | 6/1994 | Karp | |
| 5,725,449 A * | 3/1998 | Park | 474/94 |
| 5,870,928 A * | 2/1999 | Genter et al. | 74/440 |
| 5,871,221 A * | 2/1999 | Min et al. | 280/253 |
| 6,019,385 A | 2/2000 | Kelley et al. | |
| 6,053,830 A | 4/2000 | Glaeser | |
| 6,161,452 A | 12/2000 | Hilber | |
| 6,361,460 B1 * | 3/2002 | Rhee | 474/152 |

(Continued)

FOREIGN PATENT DOCUMENTS

CN    1485241 A    3/2004

(Continued)

*Primary Examiner* — Tashiana Adams
(74) *Attorney, Agent, or Firm* — Richard M. Goldberg (57) ABSTRACT

An energy transduction and conservation system has a rotatable primary driving arrangement and a rotatable driven arrangement, the driving and driven arrangements cooperating through an energy storage arrangement. The driving arrangement supplies energy to the energy storage arrangement through a one-way driving system which blocks energy release from the energy storage arrangement back to the driving arrangement. Relative rotation of the driving arrangement is transferred to the energy storage arrangement through a first releasable clutch acting on a one-way rotatable hub whereby energy stored is released only through the driven arrangement. A further one-way clutch is actuated by a differential angular rotational speed to disconnect the first releasable clutch and drive the hub at the same time the energy storage arrangement drives the driven arrangement. The first releasable clutch includes release levers pivotally mounted to release the clutch and allows the inner body to rotate in the normally locking direction.

31 Claims, 6 Drawing Sheets

U.S. PATENT DOCUMENTS 6,394,249 B1   5/2002   Tazumi et al.
6,557,877 B2 * 5/2003   Dunkley ................. 280/215

FOREIGN PATENT DOCUMENTS

| | | | |
|---|---|---|---|
| CN | 2615037 Y | 5/2004 | |
| SU | 1497098 A1 | 7/1989 | |
| TW | 512113 B | 12/2002 | |
| WO | 2006121415 A1 | 11/2006 | |

* cited by examiner

HUMAN ENERGY TRANSDUCTION AND STORAGE SYSTEM HAVING A ONE-WAY CLUTCH

BACKGROUND OF THE INVENTION

This invention relates to an energy optimization system for enhancing the efficient use of human energy and relates particularly to a system and apparatus for making use of energy, particularly that derived from human endeavour, that might otherwise be wasted or used inefficiently.

In one form, the invention is designed to make use of potential energy of a form of human endeavour where the potential energy may otherwise be unused or be used inefficiently. In another form, the invention is designed to conserve human energy in a physical activity where the energy is used to produce work. In a further form, the invention is designed to convert kinetic energy to potential energy and subsequently re-convert the potential energy back to kinetic energy.

In many tasks performed by humans in conjunction with machines or tools or other implements or aids, the effort employed by the human to move the tool or aid, or to drive the machine, uses energy supplied by the human. When that energy is inefficiently used, or when the situation of use is such that not all of the energy is utilised for the task, energy may be wasted. For example, in the simple task of riding a bicycle, due to the nature of the cranked pedals through which force is transferred to a driving sprocket to drive the bicycle, the most efficient point of energy use is when the bicycle pedal crank is at the three o'clock position. When the pedal cranks are at the "dead centre" position (six o'clock and twelve o'clock positions), no amount of force applied thereto vertically is converted to rotational work. Consequently, force applied by the rider to the pedals at the top dead position wastes energy of the rider. Forces applied to the pedals between the one o'clock and two o'clock positions, and between the four o'clock and five o'clock positions use energy less efficiently as compared to the energy use at the three o'clock position.

Similarly, in rowing a boat, the maximum conversion of energy to work occurs when the oar is substantailly at right angles to the boat. At other positions, energy may be wasted rather than converted to useful work to move the boat through the water.

U.S. Pat. No. 5,035,678 discloses a pedal and chain wheel arrangement in which a plurality of springs absorb energy during the driven portion of the pedal movement between about two o'clock and four o'clock positions of the pedals, and release that stored energy during the pedal movement from four o'clock and eight o'clock positions. However, the energy stored in this way also reacts back through the pedals thereby minimising any driving force on the chain wheel and reducing any benefit of storing the energy in the springs.

International Patent Application Number PCT/SI2006/000019 recognises the "dead point" problem associated with propulsion of cycles and proposes a rear hub that incorporates a torsion spring to store energy during the pedal stroke. However, with the structure disclosed, the spring acts between the pedals and the driven hub such that the spring produces a force reaction back through the pedals.

U.S. Pat. No. 6,161,452 discloses a pedal crank drive for a bicycle having a power transmission spring consisting of a number of individual spring elements supported between the pedal shaft and chain wheel. A damping spring may also be used between the pedal and the chain wheel. Again, however, the springs act to produce a reaction force back through the pedals.

It is, therefore, desirable to develop systems whereby the available energy produces useful work.

It is also desirable to provide systems whereby energy that is unable to produce work instantaneously is able to be stored and used subsequently.

It is also desirable to provide systems for utilising forces applied by humans to drive mechanisms, or move implements or tools whereby energy may be stored for subsequent utilisation to produce work.

SUMMARY OF THE INVENTION

According to one aspect of the invention there is provided a system for conserving and using energy during a human activity involving the use of a machine, tool or implement whereby the application of a force during utilisation of the machine, tool or implement causes energy to be stored in energy storing means, the stored energy generating a driving force isolated from the input and which is subsequent used to perform work during selected periods of the activity.

In its broadest form, the invention involves the capture and storage of surplus energy found over and above that produced by the forces needed to achieve a desired and efficient rate of acceleration. The stored energy will improve efficiency as it helps to offset deceleration.

In one particular application, the system of the invention is adapted for use with a crank operated vehicle, such as a bicycle. However, it will be appreciated that the principles of the invention have broader application and may be used with a variety of human activities involving machines, tools or implements.

Crank and eccentric operated mechanisms find various application in many tools and machines. In the instance where such mechanisms are powered by hand or foot, the ability of the operator to deliver power through the crank or eccentric varies according to the position of the crank or eccentric. One example of a crank operated machine is a bicycle where the rider operates a pedal driven crank which transfers force to at least one of the bicycle wheels. However, the force transfer affected by the rider varies as a product of the rotational position of the crank, with, as stated above, the maximum transfer of power occurring at the three o'clock position of the crank and the minimum transfer of power occurring at the twelve o'clock and six o'clock positions of the crank. Consequently, the energy applied to the crank at rotational positions of the crank other than the three o'clock position is used less efficiently to do work. Clearly, it is preferable to use any excess energy and power from the position of maximum delivery for use at the position of minimum power delivery, and therefore maximise the delivery of power through the whole rotation of a crank or eccentric. Accordingly, an embodiment of the invention has been devised with a view to improving the efficiency thereby making better use of the energy expended.

Similarly, it is preferable to use available energy and power from delivery to a shaft during times and periods of excess availability for delivery during alternative times, at the control of the operator.

In preferred embodiments of the invention, an energy transduction and conservation system is provided which comprises a rotatable primary driving means and a rotatable driven means wherein said primary driving and said driven means cooperate via an energy storage means, the primary driving means being adapted to supply energy to the energy storage means through a one-way driving system which blocks energy release from the energy storage means back to the primary driving means.

In one embodiment of the invention, the relative rotation of said primary driving means, such as a shaft rotated by pedals, is transferred to the energy storage means through a first releasable clutch acting on a one-way rotatable hub which is connected through the energy storage means to the driven means. Thus, because of the one-way operation of the rotatable hub, energy stored is able to be released only through the driven means. As the energy is released, the driven means is caused to rotate in the driving direction at a rate greater than the primary driving means whereby a further clutch is actuated by the differential angular rotational speed to disconnect the first releasable clutch and drive the pedals through the "dead point" at the same time the energy storage means drives the driven means.

With this arrangement, at the start of each pedal stroke, the pedal shaft is able to turn at an angular rotational speed greater than that of the driven means, thus causing energy to be stored by the energy storage means. Towards the bottom "dead point", the rotational force applied by the pedals lessens and the driven means becomes driven by the energy storage means, without the energy rebounding back onto the pedals. Thus, unlike the prior art devices, the pedal movement is not syschronised with the driven means.

The first releasable clutch may be of the cam locking type which may include an outer race, an inner body adapted to be mounted on a driven shaft and defining a plurality of circumferentially spaced ramps each having a generally radially extending abutment at one end, and a locking member, such as a roller, in the space between the ramps and outer race. As the inner body rotates in one direction, the abutments engage the rollers which move around the race, and the inner body is able to rotate relative to the outer race. When the inner body is caused to rotate in the other direction, such as when being driven by the pedals, the rollers roll up the ramps and lock the inner body to the race such that they rotate together. The race forms part of the one-way rotatable hub.

Preferably, a release lever is pivotally mounted adjacent the end of each ramp and is adapted to engage the respective roller in the locked position. An actuator is associated with each release lever to move the lever into contact with the roller to thereby move the roller out of the locked position to thereby release the clutch and allow the inner body to rotate in the normally locking direction.

The series of actuators are preferably axially extending fingers extending from the outer race of a further one-way clutch driven by the driven means. This means that whenever the driven means rotates at an angular rotational speed greater than the pedal speed, by being driven by the energy storage means, the pedals are caused to rotate at that rotational speed.

The energy storage means may comprise one or more spiral springs fitted around the axis of rotation of said driving and driven means. Alternatively, the energy storage means may comprise other forms of springs, or extendible bands of rubber, artificial rubber, plastics material, or other extendible material, or compressible material. Magnetic or electrical energy storage means may also be adapted to be used in embodiments of the invention.

Pre-tensioning or pre-loading energy into the energy storage means may be provided whereby the primary clutch may cooperate with a lug or abutment screw extending from said driven means to facilitate a selection of a degree of relative rotation between the primary driving means and the driven means so as to provide a selection of pre-tensioning, such as wind-up tension in a spring between the driving and driven means.

The one way-rotation of said primary driver means may be provided by a ratchet mechanism, a sprag or cam clutch, one-way bearing or the like.

The system of preferred embodiments of the invention may be incorporated into the pedal drive arrangement of a bicycle with the driven means forming the drive sprocket or sprockets for the chain drive of the bicycle. Alternatively, the system of other embodiments of the invention may be incorporated into the rear hub of a bicycle with the primary or secondary driving means forming the chain cluster or sprocket set and the driven means comprising the rear wheel hub.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

Embodiments of the invention will now be described with reference to the accompanying drawings.

LEGEND

10 Bottom bracket
11 Pedal axis
12 Pedal cranks
14 Chain wheel assembly
15 Bearings
16 Driving hub
17 Pedal shaft
18 Releasable primary clutch
19 Hub spring mounts
20 Bearing mount
21 Springs
22 Chain wheel spring mounts
23 Cam clutch
26 Outer race
27 Inner body
28 Ramps
29 Abutment
31 Roller
32 Release lever
33 Actuators
34 Nib
35 Socket 36 Outer race
37 Clutch
38 Boss
39 Bearing support
40 Flange
41 Clutch inner race
42 End plate
43 Threaded holes
44 Bolt
47 Flange
47 Lug
19' Band supports (hub)
21' Resiliend band
22' Band supports (chain wheel assembly)
30' Spring and rod arrangement
31' Knuckles
32' Integral lever
33' Actuators (FIGS. 8 and 9)
33b Groove
33c Cam surface

DESCRIPTION OF THE PREFERRED EMBODIMENTS

Figure 1:
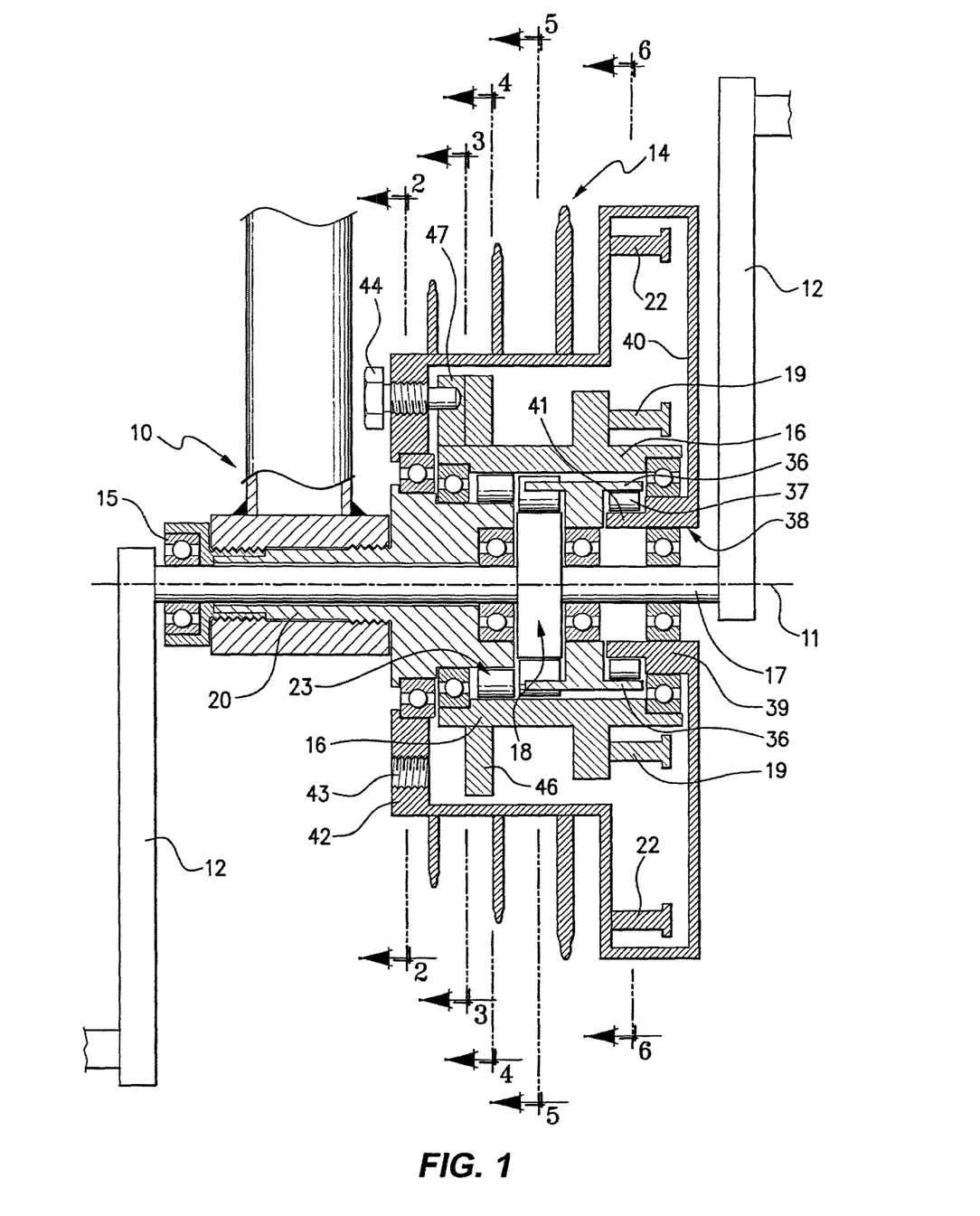
FIG. 1 is a schematic cross sectional view of one embodiment of the invention illustrating a drive system as applied to a bicycle pedal drive.

Referring to the drawings, FIG. 1 shows a cross-section through the bottom bracket 10 and along the pedal axis 11 of one embodiment of a device designed for use with a bicycle. In this embodiment, the device is fitted as an intermediate mechanical component between pedal cranks 12 and the chain wheel assembly or sprocket 14 of the bicycle crank set.

The pedal shaft 17 connecting the pedal cranks 12 is mounted by bearings 15 to the bicycle bottom bracket 10.

The device includes a rotatable primary driving hub 16 mounted for rotation about the pedal axis 11. The hub 16 is adapted to receive the driving force or torque applied to the pedal cranks 12 through pedals (not shown). The hub 16 is driven through a releasable primary clutch 18 which engages between the pedal shaft 17 and the hub 16, as shown particularly in FIG. 5. Thus, when the pedal shaft 17 is rotated by the cranks 12, the rotational movement is directly transferred to the hub 16 through the primary clutch 18.

Figure 6:
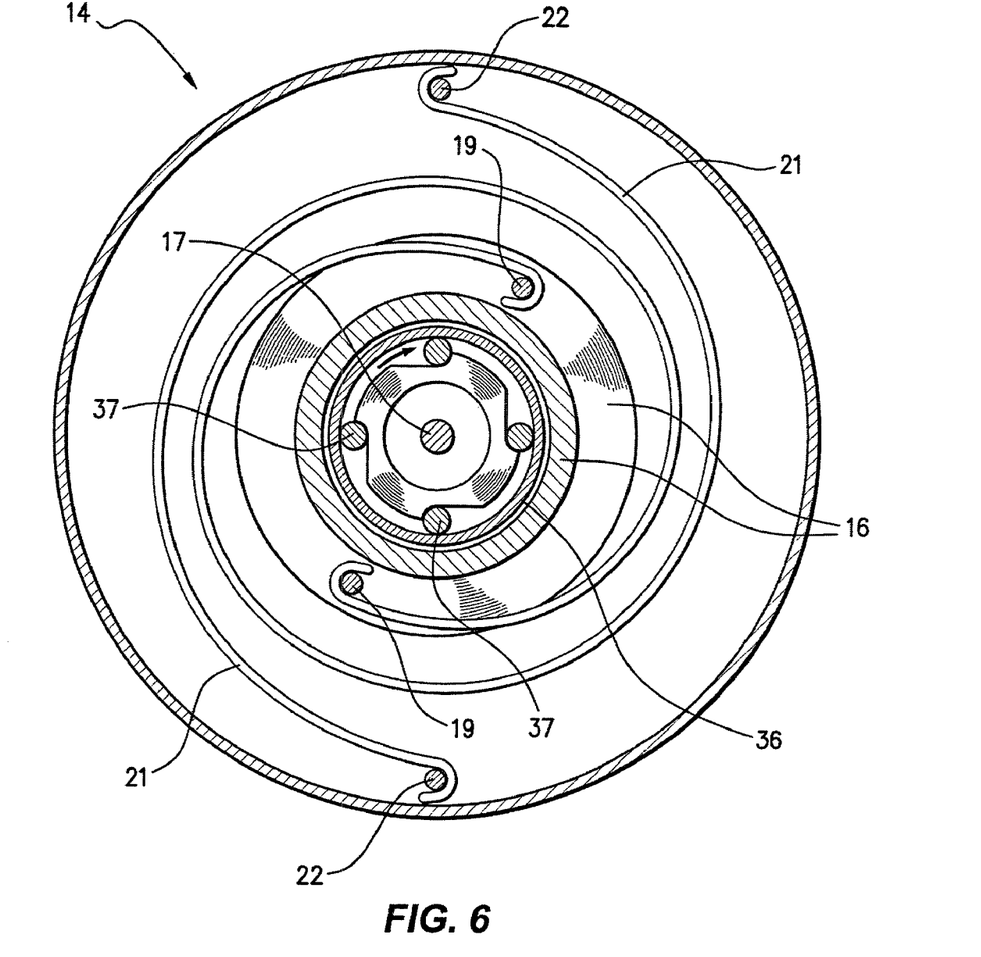
FIG. 6 is a sectional view taken along the lines 6-6 of FIG. 1.

The hub 16 is shown with two spring mounts 19. A pair of springs 21 (FIG. 6) coiled about the hub 16 engage at their inner ends with the hub mounts 19 and at their outer ends with further spring mounts 22 on the chain wheel assembly 14. It will be seen that rotation of the hub 16 will cause the springs 21 to be tensioned and, eventually, the springs will commence to drive the chain wheel assembly 14.

Figure 4:
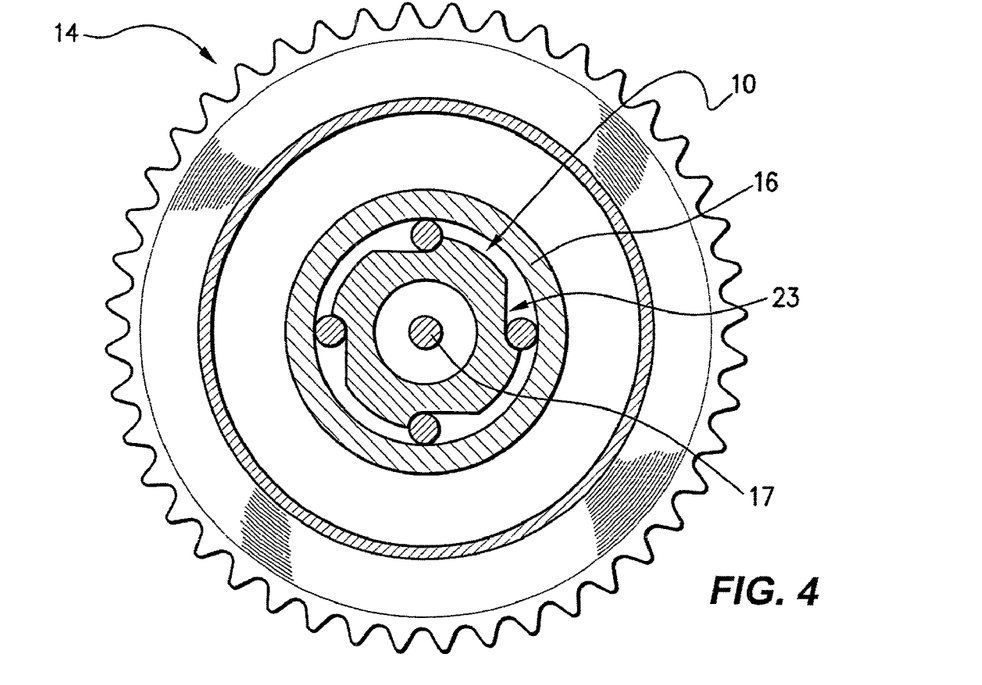
FIG. 4 is a sectional view taken along the lines 4-4 of FIG. 1.

The hub 16 is restricted to rotation in the driven direction only by a cam clutch 23 (FIG. 4) mounted between the hub 16 and the bottom bracket 10. Therefore, tension in the springs 21 is prevented from acting back from the hub 16 through the pedal shaft 17, and any stored energy in the springs 21 is able to be released only through driving the chain wheel assembly 14.

Figure 5:
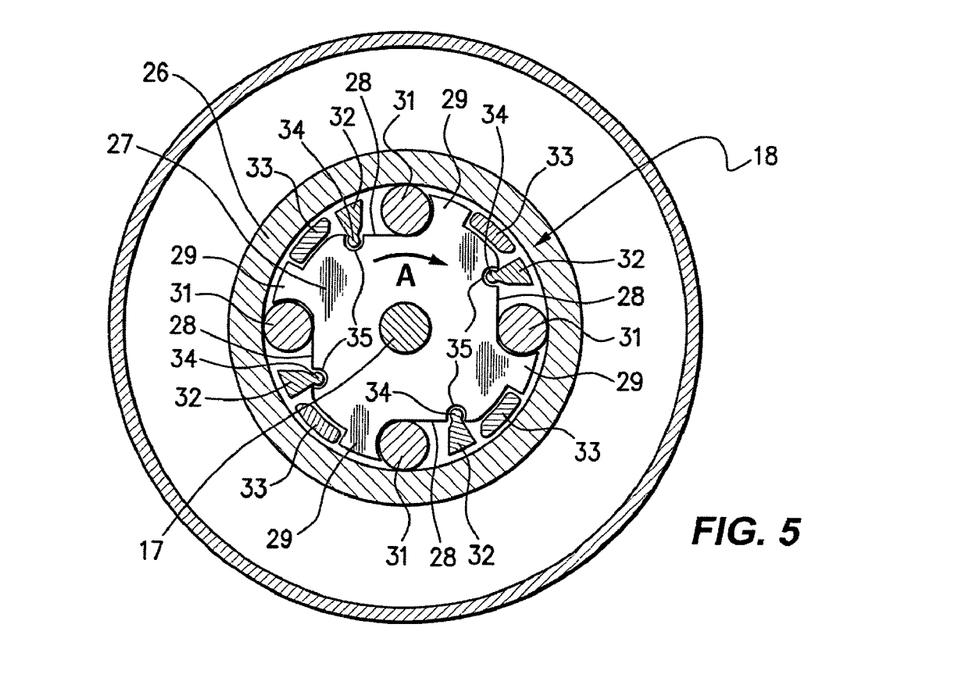
FIG. 5 is a sectional view taken along the lines 5-5 of FIG. 1.

Referring to FIGS. 1 and 5, the releasable primary clutch 18 is of the cam roller locking type which has an outer race 26, an inner body 27 mounted on the pedal shaft 17, the body 27 defining a plurality of circumferentially spaced ramps 28 each having a generally radially extending abutment 29 at one ramp end. A roller 31 is housed within the space between each ramp 28 and the outer race 26. When the inner body is caused to rotate in the driven direction, as shown by the arrow "A", such as when being driven by the pedals, the rollers 31 roll up the respective ramps 28 and lock the inner body 27 to the outer race 26 to cause them to rotate together. If the outer race 26 rotates in the direction of the arrow "A" at a rotational speed greater than that of the inner body 27, the rollers 31 are moved out of the locking position and towards the abutments 29, disengaging from the locking condition, and outer race 26 is able to rotate relative to the inner body 27. The outer race 26 forms a part of the one-way rotatable hub 16.

The releasable primary clutch 18 further includes a plurality of release levers 32 each pivotally mounted adjacent the end of each ramp 28 spaced from the respective abutments 29. The release levers 32 are adapted to pivot from an inactive position to an engaged position whereat they engage the respective roller 31 in the locked position. An actuator 33 is associated with each release lever 32 to move the lever 32 into contact with the roller 31 to thereby move the roller 31 out of the locked position to thereby release the clutch 18 and allow the inner body 27 to rotate relative to the outer race 26 in the normally locking direction of arrow "A".

The release levers 32 are important in the operation of the release because, in order to free the trapped rollers 31, the pressure applied by the inner body 27 must be eased off. To this end, the release levers 32 have a nib 34 at the inner end, the nib 34 being received within a groove or socket 35 in the ramp 28. The pivotal action of the movement of the release levers 32 caused by the actuators 33 provides a kick back by the nib 34 to the inner body 27 sufficient to release the trapped rollers 31 so that they can then be moved by the levers 32 to a released position.

The series of actuators 33 are formed by axially extending fingers extending from the outer race 36 of a further one-way clutch 37 driven by the chain wheel assembly 14 through an integral flange 40 carrying a boss 38 which provides a bearing support 39 and a driving clutch inner race 41.

In operation, rotation of the pedal cranks 12 drives the driving hub 16 through the releasable primary clutch 18. Relative movement of the hub 16 and chain wheel assembly 14 causes the springs 21 to be tensioned to the extent that the tension forces commence to rotate the chain wheel assembly 14 against restraining forces associated with driving the bicycle forward. When the driving forces on the pedal cranks 12 becomes less than the driving forces developed by the spring tension, and the chain wheel assembly 14 thus commences to rotate more quickly than the driving hub 16, the relative movement locks the one-way clutch 37 causing the fingers defining the actuators 33 to release the primary clutch 18 whereby the chain wheel assembly 14 drives the pedal cranks 12 through the finger actuators 33. This means that whenever the chain wheel assembly 14 tends to rotate at an angular rotational speed greater than the pedal speed, by being driven by the energy stored in the springs 21, the pedals are caused to rotate at that rotational speed.

Figure 2:
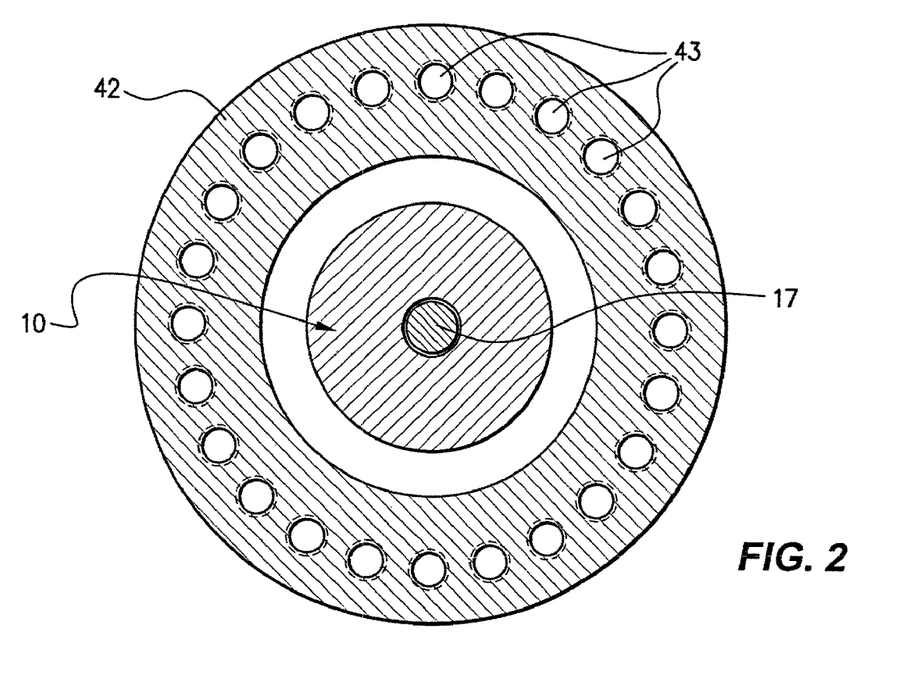
FIG. 2 is a sectional view taken along the lines 2-2 of FIG. 1.
Figure 3:
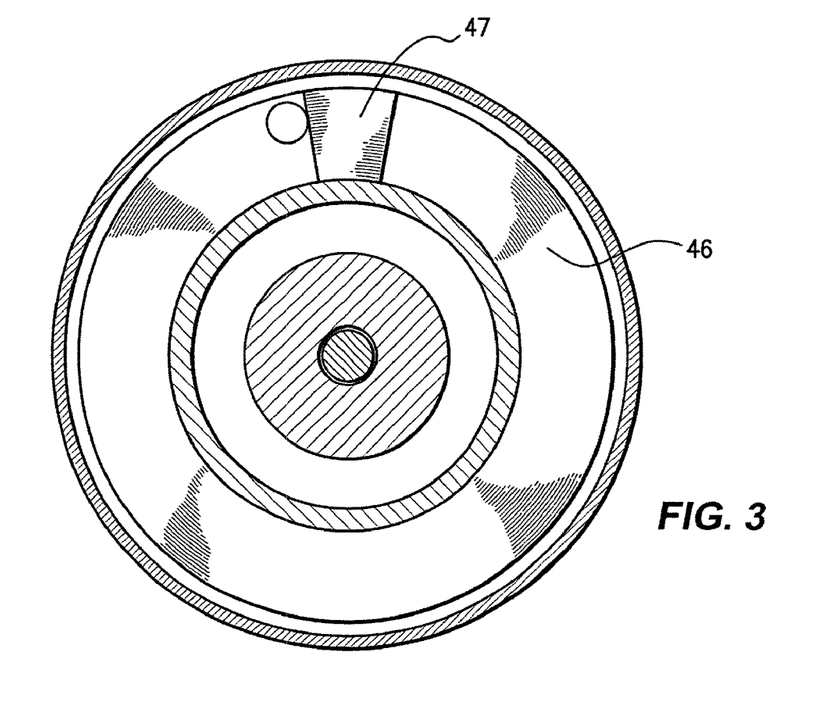
FIG. 3 is a sectional view taken along the lines 3-3 of FIG. 1.

Referring to FIGS. 1, 2 and 3, the tension in the springs 21 may be selectively pre-tensioned or pre-loaded. An end plate 42 on the chain wheel assembly 14, as well as forming a bearing support for one end of the chain wheel assembly 14 on the bottom bracket 10, has a plurality of threaded holes 43. A bolt 44 is engagable in a selected one of the holes 43 to extend in the axial direction towards a flange 46 on one end of the driving hub 16. The flange 46 carries a lug 47 against which the bolt 44 engages to maintain a selectable, predetermined tension in the springs 21. The pre-stored tension is able to be changed by changing the selected threaded hole 43 in which the bolt 44 is engaged.

It will be seen that the capacity of the spiral springs 21 to store energy allows the device to quarantine energy made available during those parts of the cycle of rotation where maximum transfer of power is available, including the three o'clock and nine o'clock positions of the crank; where, in the example of a bicycle, the rider is able to apply maximum force to the pedals at the 3 o'clock and 9 o'clock positions and able to apply virtually no force to the pedals at the 12 o'clock and 6 o'clock positions of the crank. In this manner, the device allows the variations in transfer of power of the rider, as occurs during the cycle of rotation of the crank, to more evenly distribute the available power within the cycle of rotation thereby allowing the energy to be conserved and transduced during a normal operating cycle of the device.

The particularly preferred embodiment of the invention as detailed above has the device incorporated into a pedal driven bicycle with a device being mounted to the bottom bracket 10 of a bicycle by way of an auxiliary bearing mount 20. The auxiliary bearing mount 20 replaces the bottom bracket bearing found on a traditional bicycle and provides for the direct mounting of the bearings 15 as well as other support bearings shown particularly in FIG. 1. In use in this configuration and adaptation, the device of the invention permits a rider to maximise the available energy during each single rotation of the pedals where the riders ability to exert maximum torque at the 3 o'clock and 9 o'clock positions of the device can be set up by use of the pre-tensioning bolt 44 such that the application of maximum torque at the 3 o'clock and 9 o'clock positions causes the primary clutch 18 to engage the primary driving hub 16 and wind-up the biasing springs while the torque is directed to the chain wheel assembly 14. Immediately the angle or rotation of the pedal moves down towards the 6 o'clock or 12 o'clock positions, the inability of the rider to transfer significant torque or power at that position of the cycle is compensated by the release or partial release of the energy stored in the spiral springs 21, which allows the transfer of energy held therein to the chain wheel assembly 14 thereby allowing the bicycle to continue to be driven. In another use of the device in this particular configuration and embodiment, the rider may elect to alter the pre-tensioning bolt position such that the potential energy built up by the spiral springs 21 occurs not within a single rotation of the pedals, but can be caused to occur over a plurality of rotations, with the spiral springs 21 winding up more gradually. In this use and application of the invention, the available energy of the rider in excess can be utilized for example when riding along a flat piece of road to gradually and interceptively wind up the spiral spring where upon the rider approaching a hill or other situation requiring greater energy, the full potential energy of the wound spring can be held and released during an appropriate time when it is of greatest use to the rider.

Figure 7:
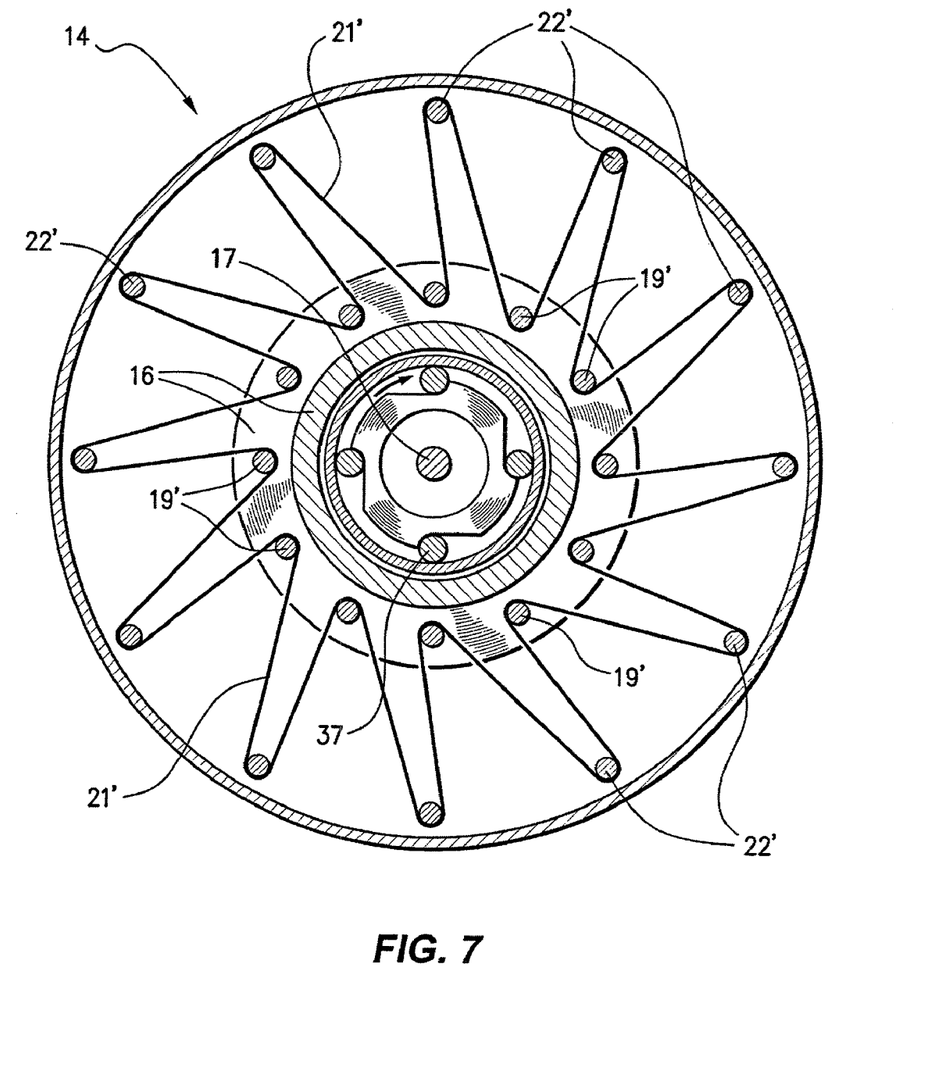
FIG. 7 is a sectional view similar to that of FIG. 6 but showing a modified arrangement of energy storage means.

FIG. 7 illustrates a modification of the above embodiment wherein the spiral springs 21 are replaced by a resilient band 21' formed of synthetic rubber, synthetic plastic, or the like. The band 21' is mounted around a plurality of supports 19' and 22' extending from the hub 16 and chain wheel assembly 14, respectively, the band 21' being able to store and release energy in a manner similar to the springs 21.

Figure 8:
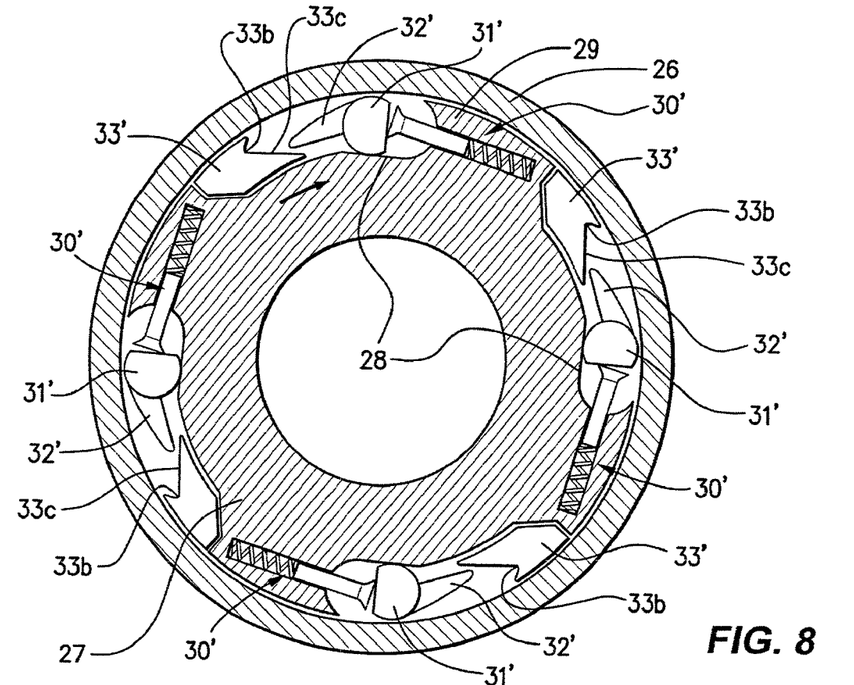
FIG. 8 is a sectional view similar to that of FIG. 5 but showing a modified form of the releasable primary clutch in a locked position.
Figure 9:
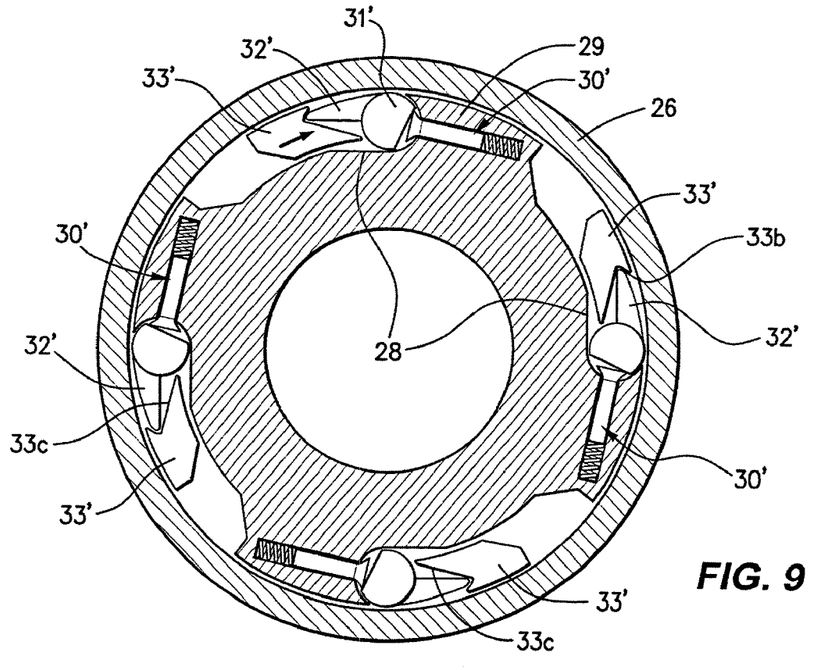
FIG. 9 is a sectional view similar to that of FIG. 8 but showing the clutch in an unlocked position.

In a modification of the releasable primary clutch 18 shown in FIGS. 8 and 9, the rollers 31 are replaced by bearing knuckles 31' which are each formed with an integral lever 32' extending from one side thereof. The knuckles 31' are biased into the locking position by a spring and rod arrangement 30', or the like, so that slippage between the outer race 26 and the body 27 is avoided or minimized. In the event that the race 26 moves with an angular velocity greater than that of the body 27, the knuckles 31' are released from the locking position, in the known manner of a cam clutch, sprag clutch, one-way bearing or the like. Otherwise, in a driving condition with the pedal cranks 12 driving the inner body 27 through the pedal shaft 17, the inner body 27 is locked to and drives the outer race 26, which is part of the driving hub 16. FIG. 8 illustrates the releasable primary clutch 18 in the locked position with each integral lever 32' angled radially inwardly toward the body due to the partial relative rotation of the respective knuckle 31' when the primary clutch 18 achieves the locked position.

With this modification, the actuators 33' are each formed on their front surfaces with a groove 33b, which faces the end of the corresponding integral lever 32', and a cam surface 33c. In use, movement of the actuators 33' relative to the inner body 27, caused through the action of the one-way clutch 37 as previously described, causes the cam surfaces 33c of each actuator 33' to engage and lift the respective integral lever 32' thus causing the associated knuckle 31' to partially rotate in the clockwise direction as viewed in FIG. 9. The partial rotation of each locked knuckle 31' moves the body 27 a small amount anticlockwise relative to the outer race 26, sufficient to release the locked knuckles 31' from their locked condition, as seen in FIG. 9. In this position, the actuators 33' will drive the inner body through the integral levers 32', the knuckles 31' and the abutments 29 housing the spring and rod arrangement 30' at an angular velocity greater than that of the driving hub 16.

The flat side of each knuckle 31' ensures that the knuckle 31' returns to its correctly aligned position in cooperation with the end of the spring and rod arrangement 30'.

The invention claimed is:

1. An energy transduction and conservation system comprising:
   a rotatable primary driving arrangement and
   a rotatable driven arrangement
   wherein said primary driving arrangement and said driven arrangement cooperate via an energy storage arrangement, and
   a one-way driving system through which the primary driving arrangement is adapted to supply energy to the energy storage arrangement and which blocks energy release from the energy storage arrangement back to the primary driving arrangement,
   the one-way driving system having a one-way rotatable hub which is connected through the energy storage arrangement to the driven arrangement to transfer relative rotation of said primary driving arrangement to the driven arrangement, and
   further including a first releasable clutch acting between the primary driving arrangement and the one-way rotatable hub to transfer relative rotation of said primary driving arrangement to the one-way rotatable hub whereby, because of the one-way operation of the rotatable hub, energy stored is able to be released only through the driven arrangement.

2. An energy transduction and conservation system according to claim 1 wherein the primary driving arrangement includes a shaft rotated by pedals attached to pedal cranks.

3. An energy transduction and conservation system according to claim 1 wherein, as energy is released by the energy storage arrangement, the driven arrangement is caused to rotate in a driving direction at a rate greater than the primary driving arrangement.

4. An energy transduction and conservation system according to claim 1 comprising a further one-way clutch actuated by a differential angular rotational speed to disconnect the first releasable clutch and drive the primary driving arrangement at the same time the energy storage arrangement drives the driven arrangement.

5. An energy transduction and conservation system according to claim 1 wherein the first releasable clutch is of a cam roller locking type which includes an outer race, an inner body adapted to be mounted on a driven shaft, the inner body defining a plurality of circumferentially spaced surfaces, and a locking member in a space between each surface and outer race, the locking member being movable between a released position, whereat the inner body is rotatable in one direction relative to the outer race, and a cam locked position whereat the locking member is trapped between the respective surface and the outer race preventing relative rotation of the inner body and race in an opposite direction.

6. An energy transduction and conservation system according to claim 5 wherein the outer race forms part of the one-way rotatable hub.

7. An energy transduction and conservation system according to claim 5 further comprising a release lever pivotally mounted adjacent one end of each circumferentially spaced surface and adapted to engage the respective locking member in a locked position.

8. An energy transduction and conservation system according to claim 7 further comprising an actuator associated with each release lever to move the lever into contact with the locking member to thereby move the locking member out of the locked position to thereby release the clutch and allow the inner body to rotate in a normally locking direction.

9. An energy transduction and conservation system according to claim 8 wherein the actuators comprise axially extending fingers extending from an outer race of a further one-way clutch driven by the driven arrangement.

10. An energy transduction and conservation system according to claim 5 wherein whenever the driven arrangement rotates at an angular rotational speed greater than the primary driving arrangement, by being driven by the energy storage arrangement, the primary driving arrangement is caused to rotate at that rotational speed.

11. An energy transduction and conservation system according to claim 1 wherein the energy storage arrangement comprises at least one spiral spring fitted around the axis of rotation of said driving and driven arrangements.

12. An energy transduction and conservation system according to claim 1 wherein the energy storage arrangement is comprised of at least one spiral spring connected between the primary driving arrangement and the driven arrangement, and a one of a lug and abutment screw extends from said driven arrangement to selectively cooperate with the primary driving arrangement to facilitate a selection of a degree of relative rotation between the primary driving arrangement and the driven arrangement so as to provide a selection of pre-tensioning, in the at least one spring between the driving and driven arrangement.

13. An energy transduction and conservation system according to claim 1 wherein the rotatable primary driving arrangement, rotatable driven arrangement and energy storage arrangement are incorporated into a rear axle assembly of a bicycle.

14. An energy transduction and conservation system according to claim 1 wherein the circumferentially spaced surfaces comprise ramp surfaces, and the locking members comprise rollers movable along the ramp surfaces between the released position and the locked position.

15. An energy transduction and conservation system according to claim 1 wherein the first releasable clutch is of a cam locking type which includes an outer race, an inner body adapted to be mounted on a driven shaft, the inner body having a plurality of circumferentially spaced surfaces that, with the outer race, define a plurality of spaces, and a knuckle in each of the said spaces between the inner body and outer race, each knuckle being movable between a released position, whereat the inner body is rotatable in one direction relative to the outer race, and a cam locked position whereat each knuckle is locked between the inner body and the outer race preventing relative rotation of the inner body and outer race in the opposite direction.

16. An energy transduction and conservation system according to claim 15 wherein the outer race forms part of the one-way rotatable hub.

17. An energy transduction and conservation system according to claim 15 wherein the knuckle incorporates an integral release lever operable to move the knuckle from the locked to the release position.

18. An energy transduction and conservation system according to claim 17 further comprising an actuator associated with each integral lever, the actuator including a cam surface to engage the lever thereby moving the knuckle, and a groove to contact an end of the lever to move the knuckle to the released position and allow the inner body to rotate in the normally locking direction.

19. An energy transduction and conservation system according to claim 18 wherein the actuators comprise axially extending fingers extending from an outer race of a further one-way clutch driven by the driven arrangement.

20. An energy transduction and conservation system according to claim 17 further comprising a spring and rod arrangement which biases the knuckles into the locking position.

21. An energy transduction and conservation system according to claim 20 wherein the knuckles are each formed with a flat side opposite the integral lever, the flat side of each knuckle ensuring that the knuckle returns to its correctly aligned position in cooperation with the end of the spring and rod arrangement.

22. A releasable clutch comprising:
an outer race,
an inner body adapted to be mounted on a shaft, the inner body defining a plurality of circumferentially spaced surfaces,
a locking member in a space between the spaced surfaces and outer race, the locking member being movable between a released position, whereat the inner body is rotatable in one direction relative to the outer race, and a cam locked position whereat the locking member is trapped between the spaced surfaces and the outer race preventing relative rotation of the body and race in an opposite direction, and
an actuator associated with each locking member and movable to thereby move the locking member out of the locked position to thereby release the clutch and allow the inner body to rotate in the normally locking direction.

23. A releasable clutch according to claim 22 wherein the locking member is a roller.

24. A releasable clutch according to claim 22 wherein the locking member is a knuckle having an integral lever extending therefrom.

25. A releasable clutch according to claim 22 further comprising a release lever pivotally mounted adjacent an end of each surface between the actuator and respective locking member and adapted to be moved by the actuator to engage the respective locking member in the locked position and move it to the release position.

26. A releasable clutch according to claim 22 wherein the actuators comprise axially extending fingers extending from an outer race of a further one-way clutch.

27. A releasable clutch according to claim 25 wherein the release levers each include a nib engaged within a respective socket in the respective surface, the nib being so arranged that movement of the lever by the actuator imparts a backwards force to the body to assist the release of the rollers.

28. A releasable clutch according to claim 24 wherein each actuator has a cam surface to engage the respective integral lever to cause partial relative rotation of the knuckle on relative movement of the respective actuator towards the knuckle.

29. A releasable clutch according to claim 28 wherein each actuator has a forward facing groove to engage the free end of the integral lever to thereby move the knuckle to the released position.

30. A releasable clutch according to claim 24, wherein each knuckle is biased towards the respective actuator by a rod and spring arrangement.

31. A releasable clutch according to claim 30 wherein each knuckle is formed with a flat surface opposite the integral lever, the flat surface being engaged by the rod and spring arrangement to ensure that the knuckle surface returns to its correctly aligned position.

* * * * *